United States Patent [19]

Mitchell

[11] Patent Number: 4,650,103

[45] Date of Patent: Mar. 17, 1987

[54] PUBLIC TRANSPORT VEHICLE SEAT SLIP COVER BROCHURE HOLDER DISPLAYING NON-REMOVABLE ADVERTISING BROCHURES

[76] Inventor: Wilburn H. Mitchell, 2152 Main St., N.W., Atlanta, Ga. 30318

[21] Appl. No.: 802,534

[22] Filed: Nov. 27, 1985

Related U.S. Application Data

[63] Continuation-in-part of Ser. No. 681,824, Dec. 14, 1984, abandoned, which is a continuation of Ser. No. 537,002, Sep. 29, 1983, abandoned.

[51] Int. Cl.⁴ ............................................. B60R 7/00
[52] U.S. Cl. .................................... 224/275; 224/277; 40/593
[58] Field of Search ........................... 150/52 C, 52 R; 224/273, 275, 311, 277; 383/38, 40; 211/55, 64, 128; 296/21; 40/124, 124.2, 124.4, 593

[56] References Cited

U.S. PATENT DOCUMENTS

| 1,550,331 | 8/1925 | Baker | 2/248 |
| 1,656,339 | 1/1928 | Runyan | 224/275 |
| 1,747,010 | 2/1930 | Keller, Jr. | 150/52 C |
| 2,154,510 | 4/1939 | King et al. | 383/38 |
| 2,710,638 | 6/1955 | Ford | 383/40 |
| 3,172,713 | 3/1965 | Rupert | 297/191 X |
| 3,187,903 | 6/1965 | Oltz | 383/38 |
| 3,479,085 | 11/1969 | Weinstein | 297/191 |
| 3,717,188 | 2/1973 | Green | 224/42.46 R |
| 4,260,091 | 4/1981 | French et al. | 224/913 X |
| 4,312,393 | 1/1982 | Green | 206/425 X |
| 4,466,659 | 8/1984 | Carpentier et al. | 224/275 X |

OTHER PUBLICATIONS

Cabela's Spring 1984 Catalog, p. 137.

Primary Examiner—Charles E. Phillips
Assistant Examiner—Robert M. Petrik
Attorney, Agent, or Firm—V. L. Leon; Harry I. Leon

[57] ABSTRACT

An article carrier of the slip cover type for mounting over the back of an automobile seat or the like and having a plurality of transparent plastic pockets arrayed in partially overlapping rows for displaying advertising brochures, maps, and other informative material. The pockets are arranged so as to make a substantial portion of the outermost brochure inserted in each pocket visible at a glance and at the same time keep all of the brochures in good condition. So that none of the pockets is ever empty in use, a hidden band within each pocket prevents a passenger from removing its outermost brochure. The remaining brochures are accessible for self distribution. When used in a taxi cab, bus, airplane, or other common carrier, this brochure holder can help inform a rider of the attractions of the community he is visiting. A taxi driver benefits by having the brochures available to help answer a rider's questions concerning places to stay and to dine. Further, the vehicle owner may obtain revenues by renting individual pockets as advertising space.

6 Claims, 4 Drawing Figures

PUBLIC TRANSPORT VEHICLE SEAT SLIP COVER BROCHURE HOLDER DISPLAYING NON-REMOVABLE ADVERTISING BROCHURES

CROSS REFERENCE TO RELATED APPLICATION

This application is a continuation-in-part of my earlier copending application, Ser. No. 681,824, filed Dec. 14, 1984 now abandoned which is a continuation of Ser. No. 537,002 filed 9-29-83, now abandoned.

BACKGROUND OF THE INVENTION

The present invention relates to an improved slip cover type article carrier for mounting on the back of an automobile or other common carrier seat and more particularly to an article carrier that presents a professional looking display of a large number of advertising brochures.

Article carriers mounted on the back of automobile front seats have previously been described by Weinstein in U.S. Pat. No. 3,479,085, by Sallop in U.S. Pat. No. 2,223,532, and by Runyan in U.S. Pat. No. 1,656,339. These article carriers were developed as a convenient means of coping with the clutter which normally accompanies automobile travel by providing storage areas for holding children's amusement devices, facial tissue boxes, maps, litter bags and various sundry articles that a family might take with it on a trip.

SUMMARY OF THE INVENTION

The object of this invention is to provide an improved slip cover type article carrier for the back of a vehicle seat that can be used for the storing and displaying of advertising brochures, so that a passenger on the seat behind can browse through them and serve himself. The article carrier accomodates a high density of brochures by so displaying them that only the upper portion of the outermost brochure in each of the pockets in the upper rows of the carrier is visible.

According to the present invention, the back of the slip cover has a plurality of partially overlapping rows of a flexible transparent material that are divided into rectangular, approximately identical pockets by sewing them to the main body panel of the slip cover. The main body panel may be made of any of the standard materials that are used to make seat covers. The pockets, each of which is slightly larger than a standard size brochure, are formed with the top of the lower row of pockets being disposed above the bottom of the proximate upper row of pockets. Enough of the upper portion of a brochure situated contiguous the transparent outer side of any pocket is viewable through it so that an observer can determine at a glance the subject matter being posted.

The outermost brochure in each pocket is retained by a band which extends downwardly from points behind and beneath the upper edge of the pocket and across its width. Each of the ends of this band is affixed to one of the vertical seams joining the outer side of each pocket to the main body panel. To position the outermost brochure, a person must first slide it beneath this band and then upwardly between it and the outer transparent plastic portion of a pocket. With the use of the band, one brochure is always left in a pocket even when all of the brochures which can be readily removed by a passenger have been withdrawn. Thus, a customer renting advertising space in a carrier can be assured that the pocket displaying his brochure will never be empty.

The slip cover is of universal design to fit the back of a wide variety of automobile, bus and airplane seats. The cover is slipped over the seat and secured by the use of a zipper, Velcro fastener or the like which is attached to at least one side panel of the slip cover.

Thus an article carrier having a slip cover body is provided which can be used to inform a passenger riding in a commercial vehicle about hotels, restaurants and places of interest that he may wish to visit. The owner of the vehicle having such a brochure holder may derive revenue from renting its pockets.

BRIEF DESCRIPTION OF THE DRAWINGS

Further details are explained below with the help of the examples illustrated in the attached drawings in which.

DESCRIPTION OF THE PREFERRED EMBODIMENT

Figure 1:
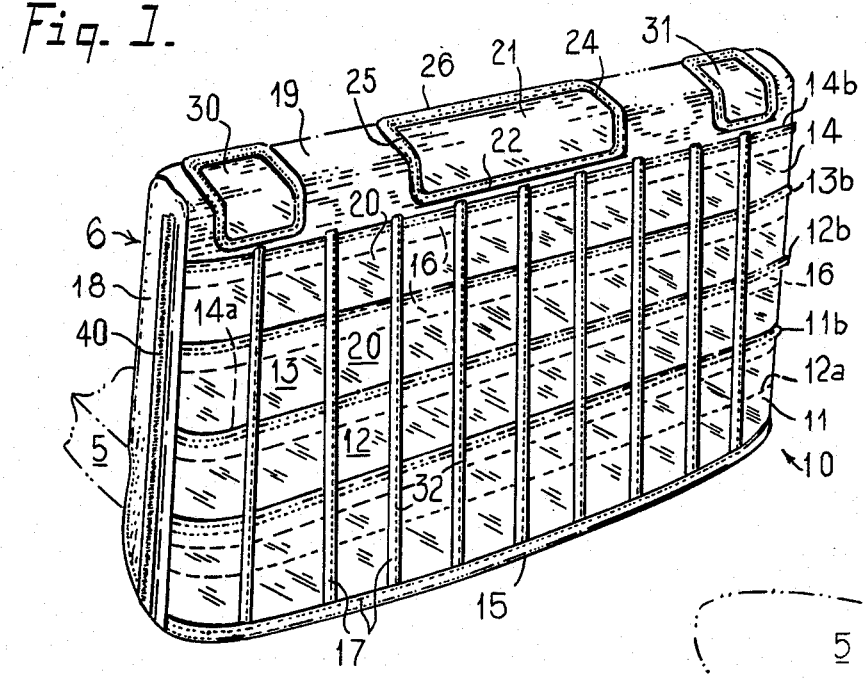
FIG. 1 is a perspective view of an article carrier of the slip cover type according to the present invention mounted on a typical automobile seat.

Referring to FIG. 1 of the drawings, an article carrier 10 of the slip cover type is mounted on the back 6 of a typical automobile seat 5. Partially overlapping rows 11, 12, 13, 14 of approximately identically sized pockets 20 extend horizontally across the rear section of the carrier 10.

The pockets 20 are formed from elongated, rectangular strips of flexible, transparent plastic material such as vinyl, polyethylene, or the like. In the preferred embodiment, one of the longer edges of each strip is first folded over a 2-ply cord 27 or the like and then stitched to form a welt 28 from which two bands 16, 36 extend for the length of the strip. Alternately, turfing, chenille, or white cotton thread may be used in place of the cord 27. In a further alternate embodiment, a welt may be formed separately and attached to one of the longer edges of each strip of plastic material. The presence of a cord or thread in the welt substantially strengthens the edge of the strip when it is formed into pockets as is described hereinbelow.

Figure 3:
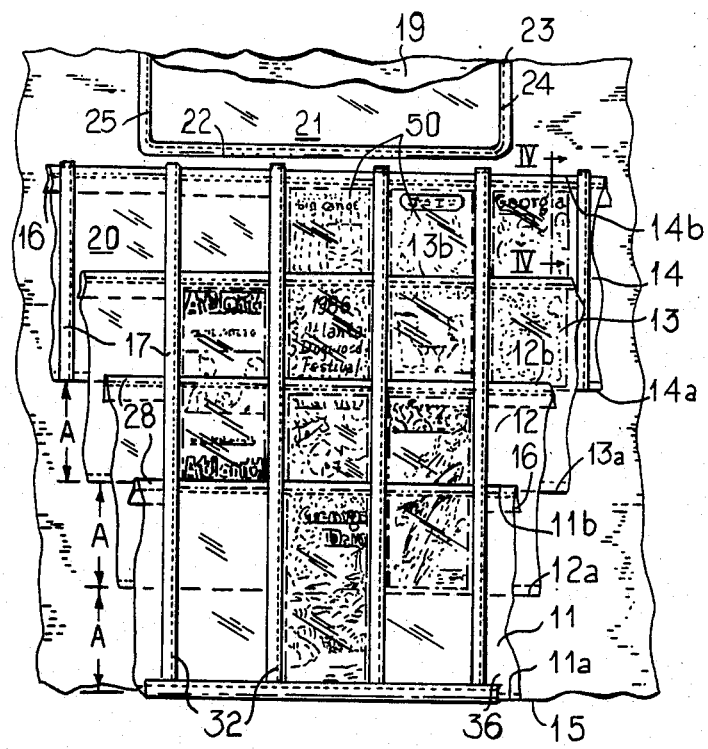
FIG. 3 is an elevational view of a fragmentary section of the article carrier according to FIG. 1 into which several typical brochures have been inserted.

The remaining longer edge 11a, 12a, 13a, 14a in each strip of transparent plastic material is then stitched to a body panel 19 formed of a flexible material commonly used in seat covers such as vinyl, nylon, acrylic, polyester, or the like. The edges 11a, 12a, 13a, 14a are disposed approximately parallel to the bottom edge 15 of the panel 19 and spaced from each other a distance A as shown in FIG. 3. The strips of transparent plastic material are so joined to the panel 19 that each of the narrow bands 16 is disposed inwardly of a proximate band 36. The opposing narrow edges of each of the strips are then stitched, together with the body panel 19, to a pair of side panels 18, preferably formed from the same material as the panel 19, completing the slip cover body of the carrier 10.

The strips of transparent plastic material are made into rectangular pockets 20 by sewing them to the panel 19 along a plurality of vertical seams 32 which are parallel to each other and to the seams between the side panels 18 and the panel 19. For holding standard size, 4 inch by 9 inch brochures 50, the interior compartment of each of the pockets 20 measures, by way of example, approximately 5 inches wide by 9¼ inches deep. The distance A is approximately 4¾ inches so that the rows 11, 12, 13 overlap the pockets 20 within the rows 12, 13, 14, respectively, by a distance of approximately 4½ inches, thereby allowing four rows of pockets to be situated in a space that would otherwise accomodate only two rows. All of the dimensions of the pockets 20 may be varied to accomodate brochures of a different size.

A welt 17 formed by folding binding over a 2-ply cord or the like and joining together the opposing sides of the binding is preferably added to the vertical seams 32, with the welts 17 extending beyond the upper edges 11b, 12b, 13b, 14b of the rows of pockets. Not only do the welts 17 reinforce the seams 32 but the extensions of each contiguous pair of welts past the upper edges 11b, 12b, 13b, 14b form a track between which the lower edge of a brochure can be slid to help align it approximately parallel to the upper edge of a pocket 20 prior to its insertion therein. Thus with the welts 17, a large array of pockets 20 can be easily and rapidly filled with brochures without inflicting significant damage on the junctures between the pockets and the remainder of the carrier 10 even though the width of the openings in the pockets 20 is comparable to that of the brochures.

The outermost brochure 50 in each pocket 20 is preferably inserted into the pocket by itself. Such a procedure allows the upper edge of the brochure, once it is inside the pocket, to be inserted under the band 16 and slid between it and the band 36 until the brochure abuts the welt 28. The primary function of the band 16 is to retain at least one brochure 50 in a pocket 20, so that an advertiser can be assured that the pocket displaying his brochure will never be empty. The band 16, which like the band 36 is joined to the sides of each pocket 20 by the seams 32, extends downwardly within a pocket a sufficient distance to make the removal of the outermost brochure difficult for a passenger but not so hard as to prevent a vehicle operator, who has the option of temporarily slipping the carrier from the back of the seat, from inserting the outermost brochure or from replacing it as required. Further, the downward extension of the band 16 must be adequate to prevent brochures which have been placed in a pocket for distribution from becoming snagged on the lower edge of the band 16 as they are being removed.

Figure 4:
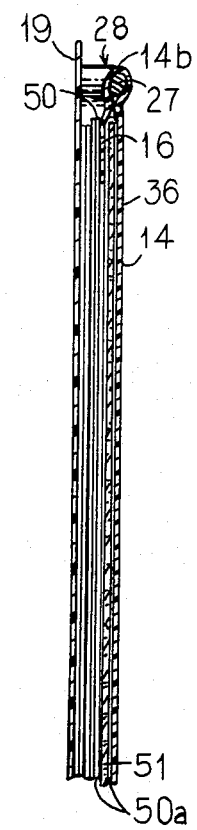
FIG. 4 is an enlarged sectional view taken on line IV—IV of FIG. 3, showing in cross-section the hidden band retaining the outermost brochure within a pocket.

Not only is the band 16 employed to retain at least one brochure in a pocket at all times, but the band 16 also provides for the maintenance of the outermost brochure in an unsoiled condition for display purposes and facilitates the removal of the remainder of the brochures. As is illustrated in FIG. 4, the bulk of the brochures 50 placed in a pocket 20 are situated behind the band 16, with the upper edges of these brochures being only slightly recessed within the pocket. Even though the brochures do not protrude from the pocket, those, not held in place by the band 16, can be easily withdrawn. The ease of their removal is enhanced by the presence of the non-removable, outermost brochure. Because of it, a passenger in the process of removing a brochure is able to slide it past at least one brochure.

Repeated trials have shown that sliding one brochure across another is much easier to do than trying to remove a brochure which has become stuck to the transparent plastic material forming the outer side of a pocket 20, as any brochure contiguous this material is prone to do when it becomes sticky in warm weather. Moreover, because of the thickness of the band 16, a slight separation is formed along the lower edge of this band between the outermost brochure and any brochure contiguous to it, further facilitating the removal of a brochure placed in a pocket 20 for distribution. This slight separation, like that occurring along the edge 12a, 13a, 14a in pockets in the lower rows, is important in reducing the magnitude of the cohesive forces which tend to hold a brochure within a pocket when it is filled to capacity.

On the other hand, the tendency of a brochure 50 to adhere to the transparent plastic material within a pocket is enhanced in the case of the outermost brochure by combining a configuration in which there is a close fit between the outer side of a pocket and a brochure of standard size with the action of the band 16. As the outermost brochure is inserted between the bands 16, 36 in a pocket 20, the band 36 stiffens; and any wrinkles in it smooth, thereby allowing the printed material on the outermost brochure to be viewed, without significant distortion, through the band 36. An insert 51 formed of pasteboard or the like may also be included between the folds 50a of the outermost brochure to stiffen it further and stretch this outer side of the pocket formed of transparent plastic material. The insert 51 is especially useful in displaying a brochure which is of less than standard size.

Figure 2:
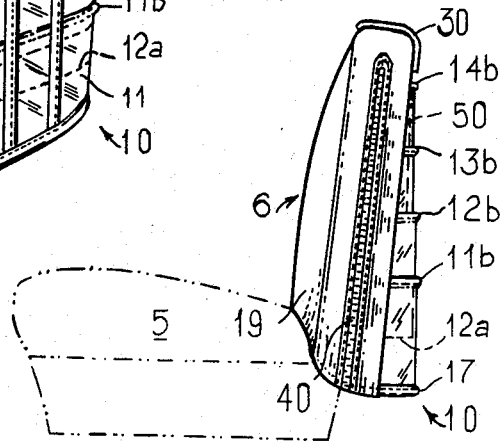
FIG. 2 is a side view of the article carrier according to FIG. 1 mounted on a typical automobile seat.

A large center pocket 21 made of a rectangular section of flexible, transparent plastic material such as polyethylene, vinyl or the like occupies a central location in the preferred embodiment shown in FIGS. 1, 2 and 3. The pocket 21 may be reinforced by a welt similar to the welt 17 along each of its sides. Opposing sides 24, 25 and the bottom edge 22 of the pocket 21 are stitched to the panel 19 forming a compartment opening along the top edge 26 and away from the rider. The choice advertisement space provided by the pocket 21 measures, by way of example, about 18 inches wide by 8 to 10 inches high and is one in which informative material can be permanently displayed.

Two additional pockets 30 and 31 may also be included. The construction of these pockets is the same as that of the pocket 21; but they are in general smaller. For both of these intermediate sized pockets 30, 31, typical dimensions of each are about 6 inches wide and 8 inches high. Like the pocket 21, the opening of each of the pockets 30, 31 is directed away from a passenger in the back seat. Thus the pocket 30 which is mounted behind the driver may be used for licenses and the pocket 31 for a city map.

As is illustrated in FIGS. 1 and 2, a zipper 40 is stitched in at least one of the side panels 18 to facilitate mounting and dismounting the article carrier 10 on the seat back 6. Alternately, the carrier 10 may be slipped over the back 6 by opening a Velcro fastener (not shown) or the like attached to one of the side panels 18. A loose-fitting slip cover body such as that shown for the article carrier 10 in FIGS. 1 and 2 covers a wide variety of seat backs; but for very large variations in seat backs, alterations in the panels 18 and 19 may be required. To provide a closer fit between the carrier 10 and the seat back 6, straps (not shown) may be sewn to the interior side of the panel 19 which extend upward, over the top of the seat back, and, hidden from view, down the front surface thereof; one end of each such strap may be equipped with a buckle (not shown) to hold the carrier in place.

It will be understood that the invention is not limited to the embodiments disclosed but is capable of numerous rearrangements, modifications and substitutions without departing from the scope of the invention.

What is claimed is:

1. In combination with a slip cover for the back of a vehicle seat, the slip cover having a substantially rectangular body panel of a first flexible material which is doubled over in such a way that opposing outer edges of the body panel can be stitched to a pair of flexible side panels, wherein the improvement comprises:
  (a) at least three elongated panels of approximately rectangular shape formed from a second flexible material and each having approximately the same dimensions; each elongated panel being folded and stitched proximate the fold along the length thereof to form a wide band and a narrow band, the narrow band being disposed contiguous the body panel, the wide band overlying the narrow band; each elongated panel being stitched along the length of the lower edge of the wideband, which is disposed away from the fold, to the back of the body panel; each band being secured to the side panels at opposite ends of the band by the same seams which secure the body panel to the side panels; and
  (b) each elongated panel being joined to at least one contiguous elongated panel in a configuration of partial overlap, the upper portion of the lower elongated panel being disposed outwardly of the lower portion of the elongated panel contiguous thereto and immediately above said lower elongated panel; the wide and narrow bands of each elongated panel being joined to each other and to the body panel by a plurality of vertical seams spaced approximately equidistant from each other and from the seams joining the wide and narrow bands to the side panels; the spacing between each contiguous pair of vertical seams being approximately equal to the width of a first brochure of standard size; the distance separating each proximate pair of said lower edges being less than the height of a transverse cross-section of the wide band of each of the elongated panels, so that an extra row of pockets can be formed in a space which would otherwise accomodate only two rows of like-sized pockets; the distance between the stitching along the upper and lower edges of each pocket being only slightly greater than the length of said first brochure, there being a close fit between a section of the wide band which also forms the outer side of a pocket and said first brochure, the first brochure prior to use being inserted in front of a section of the narrow band within the pocket until the upper edge of the first brochure abuts the stitching proximate the fold, said section of the wide band having no projections across the entire surface of said section of the wide band which is adapted to form an interface with the first brochure, the absence of projections allowing maximum cohesive forces to form between the second flexible material, which tends to be sticky, and the first brochure at this interface, thereby making the first brochure difficult to remove from the pocket; the section of the narrow band extending downwardly from and rearwardly of the upper edge of the first brochure and completely covering said upper edge; the downward extension of the section of the narrow band preventing a second brochure of standard size which may be placed in the pocket behind the first brochure for distribution, with the upper end of the second brochure being disposed behind said section of the narrow band, from being snagged on the narrow band as the second brochure is being removed; the second brochure being much more readily removed from the pocket than is the first brochure whenever both are present therein, the narrow band covering the upper edge of the first brochure and the cohesive forces between said section of the wide band and the first brochure insuring that, while the slip cover is operably disposed on the back of the vehicle seat, the first brochure is retained in the pocket.

2. In the combination according to claim 1 wherein the improvement further comprises a plurality of welts, each welt being disposed along and secured by one of said vertical seams; the welts extending from first points disposed downwardly of the superior edge of the lowermost elongated panel to second points disposed upwardly of the superior edge of the uppermost elongated panel; the welts being disposed outwardly of the elongated panels between said first points and the superior edge of the uppermost elongated panel, so that a brochure of standard size can be slid downwardly between portions of a contiguous pair of welts which extend upwardly from and overlie either end of the superior edge of a pocket to facilitate insertion of the brochure into the pocket.

3. In combination with a slip cover for the back of a vehicle seat, the slip cover having a substantially rectangular body of flexible material which is doubled over in such a way that opposing outer edges of the body panel can be stitched to a pair of flexible side panels, wherein the improvement comprises:
  (a) at least three elongated panels of approximately rectangular shape formed from sheets of transparent, flexible material, each of the elongated panels having approximately the same dimensions and being folded and stitched proximate the fold along the length thereof to form a wide band and a narrow band, the narrow band being disposed contiguous the body panel, the wide band overlying the narrow band; each elongated panel being stitched along the length of the lower edge of the wide band, which is disposed away from the fold, to the back of the body panel; each band being secured to the side panels at opposite ends of the band by the same seams which secure the body panel to the side panels; and
  (b) each elongated panel being joined to at least one contiguous elongated panel in a configuration of partial overlap, the upper portion of the lower elongated panel being disposed outwardly of the lower portion of the elongated panel contiguous thereto and immediately above said lower elongated panel; the wide and narrow bands of each elongated panel being joined to each other and to the body panel by a plurality of vertical seams spaced approximately equidistant from each other and from the seams joining the wide and narrow bands to the side panels; the spacing between each contiguous pair of vertical seams being approximately equal to the width of a first brochure of standard size; the distance separating each proximate pair of said lower edges being less than the height of a transverse cross-section of the wide band of each of the elongated panels, so that an extra row of pockets can be formed in a space which would otherwise accomodate only two rows of like-sized pockets; the distance between the stitching along the upper and lower edges of each pocket being only slightly greater than the length of said first brochure, there being a close fit between a section of the wide band which also forms the outer side of the pocket and said first brochure, the first brochure prior to use being inserted in front of a section of the narrow band within the pocket until the upper edge of the first brochure abuts the stitching proximate the fold, said section of the wide band having no projections across the entire surface of said section of the wide band which is adapted to form an interface with the first brochure, the absence of projections allowing maximum cohesive forces to form between the transparent, flexible material, which tends to be sticky, and the first brochure at said interface, thereby making the first brochure difficult to remove from the pocket; the section of the narrow band extending downwardly from and rearwardly of the upper edge of the first brochure and completely covering said upper edge; the downward extension of the section of the narrow band preventing a second brochure of standard size which may be placed in the pocket behind the first brochure for distribution, with the upper end of the second brochure being disposed behind said section of the narrowband, from being snagged on the narrow band as the second brochure is being removed; the second brochure being much more readily removed from the pocket than is the first brochure whenever both are present therein, the narrow band covering the upper edge of the first brochure and the cohesive forces between said section of the wide band and the first brochure insuring that, while the slip cover is operably disposed on the back of the vehicle seat, the first brochure is retained in the pocket for display purposes when any brochure placed with the upper end thereof behind the section of the narrow band has been removed from the pocket.

4. In the combination according to claim 3 wherein the improvement is further characterized by a smoothing of any wrinkles in the side of the pocket formed of transparent material as said interface is being formed, so that any printed matter on the face of the first brochure contiguous with the side of the pocket formed of transparent material is viewable therethrough above the upper edge of any pocket disposed downwardly of the upper edge of said side and viewable without distortion due to wrinkling of the transparent material.

5. An article carrier of the slip cover type for mounting on the back of a vehicle seat comprising:
   (a) a slip cover body having a panel of flexible material which is disposed contiguous with said back and which extends downwardly from the upper edge thereof;
   (b) a plurality of generally rectangular pockets; one side of each pocket being formed of a flexible, transparent material which is folded along the upper edge of the pocket to form a wide band and a narrow band, the lower edge of each band being disposed approximately parallel to the upper edge of the pocket; the narrow band being disposed contiguous said slip cover body which comprises the other side of each pocket, the wide band overlying the narrow band;
   (c) said pockets being arranged in at least two rows spaced generally parallel to each other, the upper edge of the lower row of pockets being disposed above and outwardly from the lower edge of the contiguous upper row of pockets, the lower row of pockets only partly covering the upper row of pockets; the width of each pocket being slightly greater than the width of a brochure of standard size and the depth of each pocket being slightly greater than the length of the brochure of standard size; and
   (d) means having an upper edge which is inserted in front of and upwardly of the narrow band within the pocket for stretching the wide band, the wide band having no projections across the entire surface of the wide band which forms an interface with the stretching means, the absence of projections allowing maximum cohesive forces to develop between the transparent, flexible material of the wide band, which tends to be sticky, and the stretching means at said interface; the narrow band in each pocket extending downwardly from the upper edge of any brochure of standard size which has been placed in the pocket; the downward extension of the narrow band preventing such a brochure placed in the pocket for distribution, with the upper end of the brochure being disposed behind said narrow band, from being snagged on the narrow band as the brochure is being removed; the narrow band covering the upper edge of the stretching means and the cohesive forces between the wide band and the stretching means insuring that, while the slip cover body is operably disposed on the back of the vehicle seat, the stretching means is retained in the pocket for display purposes when any brochure placed with the upper end thereof behind the narrow band has been removed from the pocket.

6. The article carrier according to claim 5 in which the stretching means is further characterized as having a brochure which is inserted in front of the narrow band, the transparent, flexible material of the wide band adhering to the brochure so inserted, thereby making the brochure so inserted difficult to remove from the pocket and keeping the brochure so inserted in position for display purposes even when any brochure placed with the upper end thereof behind the narrow band has been removed from the pocket.

* * * * *